July 8, 1958
B. I. ULINSKI
2,842,216
MOUNTING FOR STEERING AND TRACTION UNIT
Filed Oct. 31, 1955
4 Sheets-Sheet 2
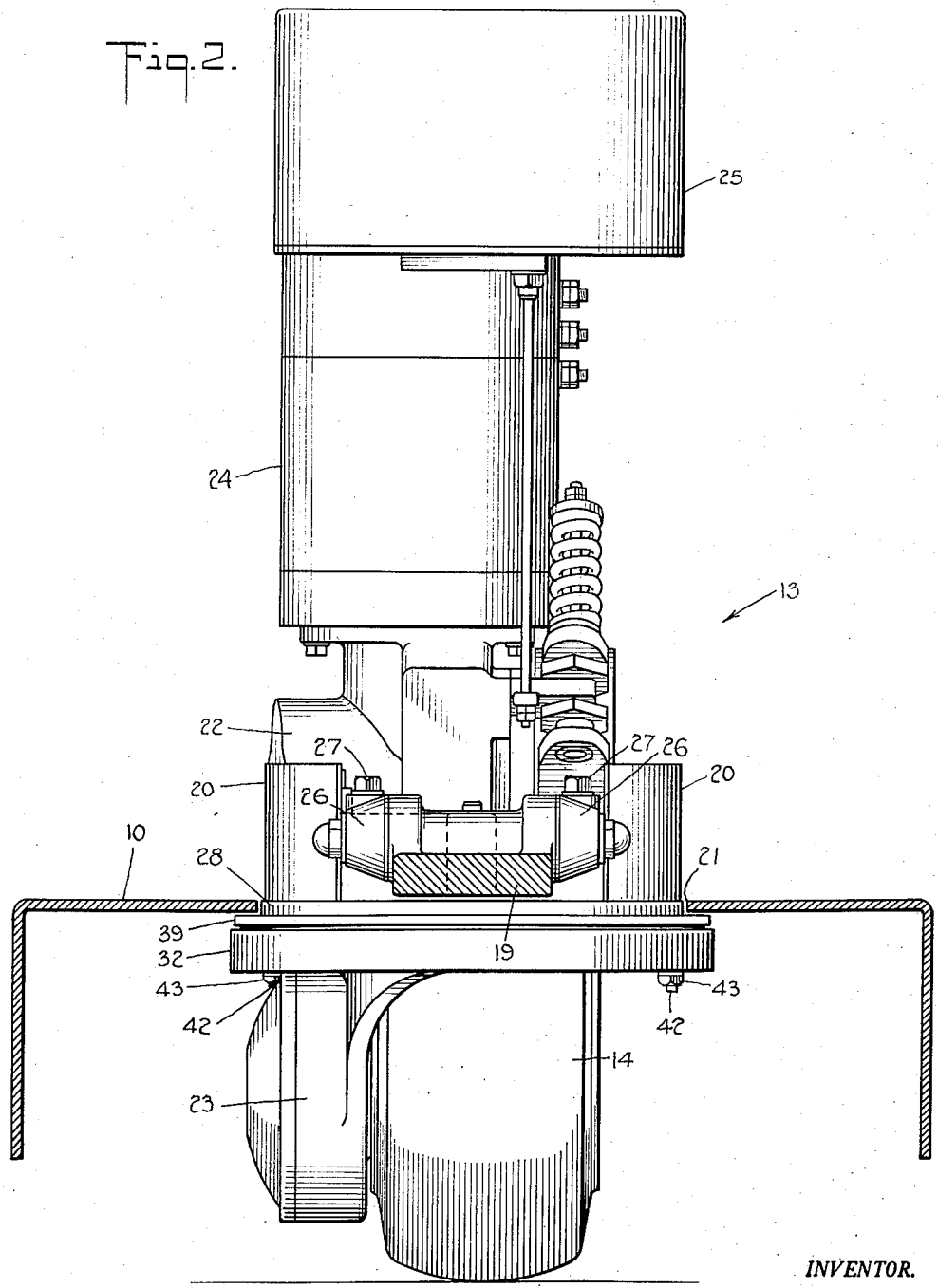
INVENTOR.
B. I. Ulinski
BY
A. H. Golden
ATTORNEY

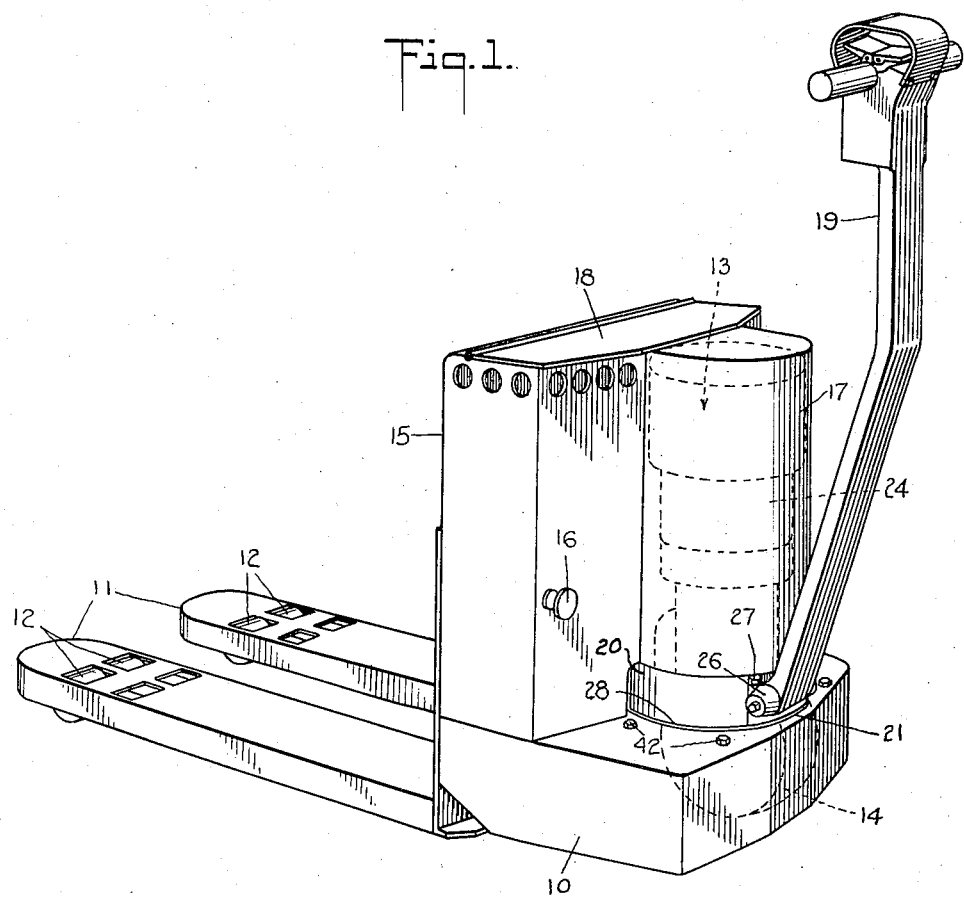

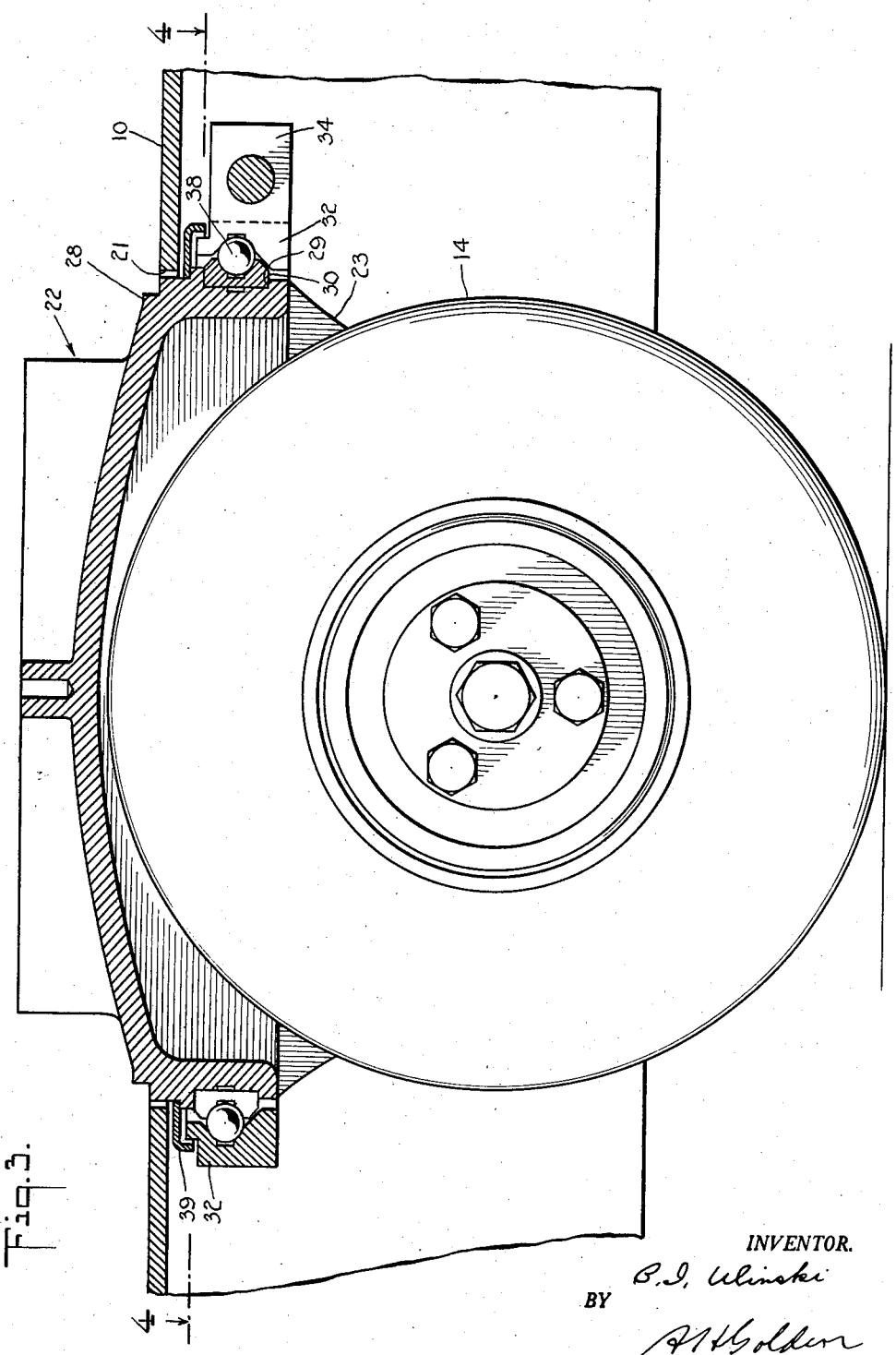

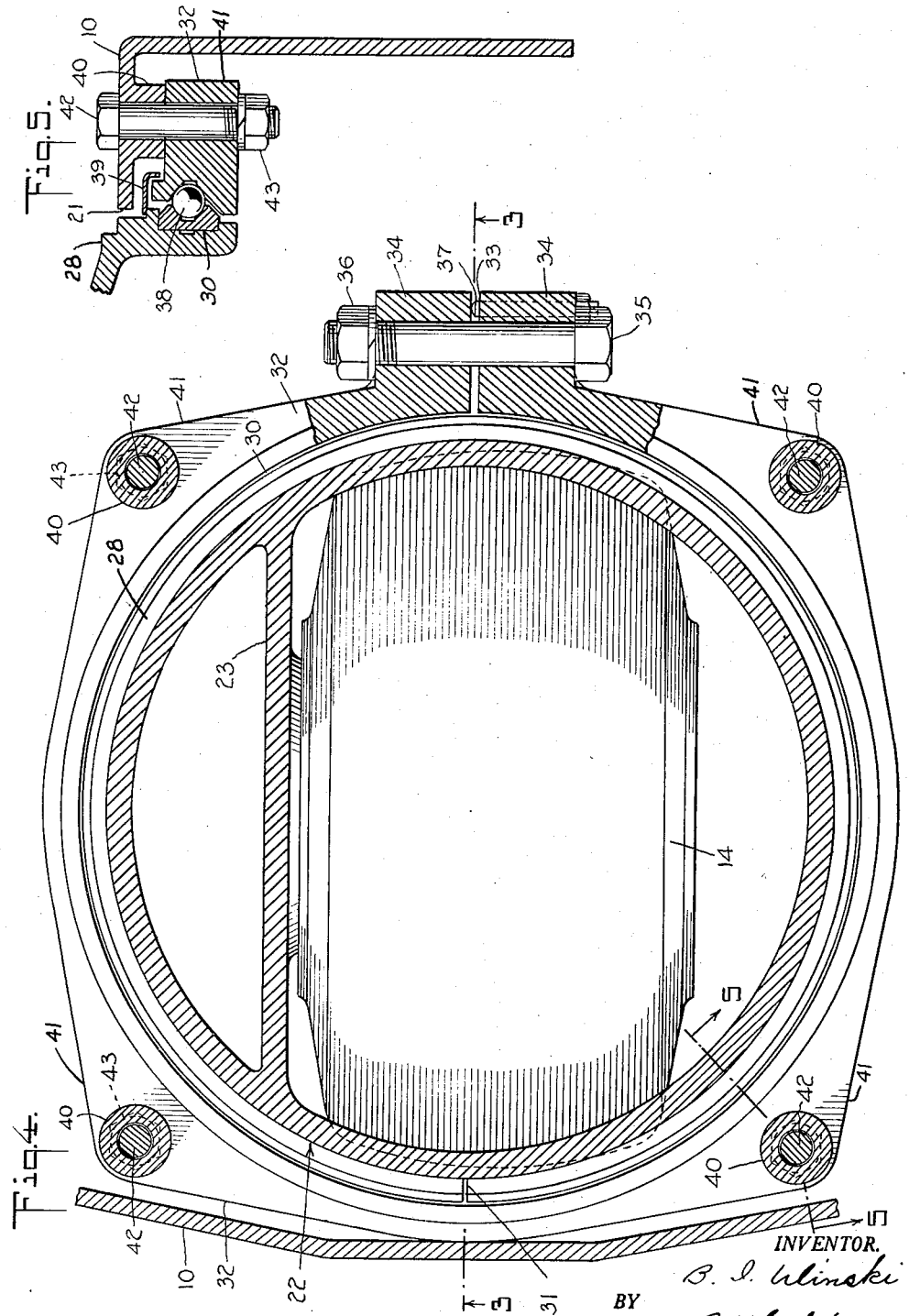

United States Patent Office 2,842,216
Patented July 8, 1958

2,842,216

MOUNTING FOR STEERING AND TRACTION UNIT

Bronislaus I. Ulinski, Flossmoor, Ill., assignor to The Yale & Towne Manufacturing Company, Stamford, Conn., a corporation of Connecticut Application October 31, 1955, Serial No. 543,658

4 Claims. (Cl. 180—13)

This invention relates to a motorized industrial truck of the type in which a steering and traction unit is rotatably mounted on the truck for imparting both steering and traction movement to the truck.

Those skilled in the art fully appreciate that trucks of the particular class are well known and that there are numerous patents issued showing the structure of those trucks. The mounting of the steering and traction units on the trucks has presented many problems that, so far as I know, remain unsolved to this day. In general, it has been the practice to assemble first a steering and traction unit including a motor and a traction wheel, together with power transmission means between the motor and the wheel. This traction unit is then mounted on the frame of the truck through suitable means, generally bearings positioned between the traction unit and the frame of the truck.

This type of mounting, presents many difficulties in manufacture and assembly. Non-friction bearings are generally used in a combination of the class I have described, and it is difficult to form the outer race of such a bearing on the truck and the inner race on the steering and traction unit. In some cases, the prior art has attempted to meet the problem by providing vertically spaced adjusting means, as in the Framhein Patent No. 2,327,583. There, the frame of the truck is formed with a bearing race, and assembled relatively thereto are upper and lower races that are brought together into proper adjustment by a series of bolts.

In other structures of the prior art, the entire steering and traction unit has been mounted at its extreme upper end relatively to the main frame. Those skilled in the art will appreciate that this presents many problems since the stresses that are then developed at the upper end of the steering and traction unit, incidental to the steering and driving of the truck, are quite large.

The invention that I have conceived contributes a mounting for a combined steering and traction unit that may be utilized near the lower end of the unit where the stresses are relatively small. Further, my invention allows the utilization of a combined steering and traction unit together with a complete bearing assembly, the two forming a sub-assembly that may be readily applied to a truck of the class described.

As a feature of my invention, I utilize a non-friction bearing assembly comprising an inner race carried by the steering and traction unit, together with a series of non-friction bearings and an outer race. The outer race is so formed that it can be adjusted relatively to the inner race and the non-friction bearings during the assembly thereof to the non-friction bearings. This outer race is adapted, further, to be assembled to the truck through simple means such as bolts.

As a more detailed feature of my invention, I construct the outer race in the form of a split ring that may be drawn together in suitably adjusted relation to the inner race and to the non-friction bearings that are carried between the inner and outer races. The non-friction bearings are preferably ball bearings, but other bearings may conceivably be utilized. I prefer to form the ring with portions that will bear against the truck frame and that are bored to receive the fastening bolts. By fastening the split ring, the bolts will secure to the truck the steering and traction unit for steering rotation through the non-friction bearings.

As a further feature, I form the inner bearing race separately from the steering and traction unit, with means whereby the race is very readily assembled to the unit, yet very securely held when in assembled position. For the particular purpose, I form the steering and traction unit with a circular groove for the inner race, and I construct the race as a split ring that fits the groove when snapped into position in the groove.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 shows a motorized industrial truck that is equipped with my novel steering and traction unit mounting.

Fig. 2 is a front view showing the unit and its mounting.

Fig. 3 shows the mounting in detail on the line 3—3 of Fig. 4.

Fig. 4 is a section on the line 4—4 in Fig. 3.

Fig. 5 is a section on the line 5—5 in Fig. 4.

For the purpose of describing my invention, I show in Fig. 1 a truck that has a main frame 10 and a pair of load forks 11 extending rearwardly from the frame 10. The forks 11 are equipped with load wheels 12 that support the rear end of the truck, as is usual in trucks of the particular class, while the main frame is supported at the front of the truck through a steering and traction unit 13 that has ground engaging wheel 14. Just rearwardly of the steering and traction unit 13 the main frame 10 supports the usual battery, not shown. The battery is enclosed by a cover 15 that is removable through the operation of a pair of screws 16, only one of which is shown in Fig. 1. The front of cover 15 is formed with a curved part 17 that substantially encloses the steering and traction unit 13, the cover 15 further having a hinged top 18 that permits easy access to the battery. For control purposes, a handle 19 is pivoted to the steering and traction unit 13 below the bottom edge of cover part 17. The unit 13 is enclosed at either side of the handle 19 by a pair of curved plates 20 that rotate with the unit 13 as it is steered.

Naturally, the steering and traction unit 13 has driving and controlling means for the wheel 14, but the details of those means are not important to an understanding of my invention. It is important merely to realize that the unit 13 is so constructed that it can move into assembled position on the truck through insertion into an opening 21 in the main frame 10. Thus, as best seen in Fig. 2, the unit 13 has as its base portion a gear case 22 of such size that it can be inserted upwardly into assembled position in the frame opening 21. A part 23 of gear case 22 is then positioned for supporting the wheel 14 below the truck frame 10. The upper end of gear case 22 supports a motor 24 that drives the wheel 14 through gears in the case, and the motor 24 in turn supports a housing 25 for various controls that are utilized on the traction unit, but the motor 24, housing 25, and further parts on the unit 13 will have clearance relatively to the frame opening 25 so that the unit can be inserted into that opening. A mounting 26 for the handle 19 projects forwardly from the gear case 22, but that pivot mounting can very readily be disassembled through the removal of screws 27 that attach it to the unit 13.

In the extremely novel structure that I have conceived for mounting the steering and traction unit 13, I utilize on the unit a circular part 28 that I prefer to form as an integral portion of the gear case 22, as is well shown in Figs. 3 and 4. This circular part 28 is formed to have clearance relatively to the frame opening 21 so that it may rotate in that opening. Also, I construct the circular part 28 to extend about an upper part of the traction wheel 14, so that that wheel may be relatively large while enabling me to place the part 28 at a relatively low point on the steering and traction unit. In the outer periphery of the circular part 28, I form a groove 29, shown in Fig. 3. Fitting in this circular groove 29 is an inner ball race 30 that I form particularly with a slot 31, Fig. 4, so that the race actually is a split ring. Thereby the inner ball race 30 can be assembled to the traction unit 13 merely by expanding it slightly and snapping it into place in the groove 29 of the circular part 28.

I utilize further an outer ball race 32 that I assemble to the traction unit 13 before the unit is assembled to the truck. The outer race 32 has at one side a slot 33, well shown in Fig. 4, whereby this race is a split ring. At opposed sides of the slot 33, I form the outer race 32 with integral lugs 34 that are bored to receive a bolt 35. This bolt 35 is equipped with a nut 36 so that the bolt can draw the ends of the outer race 32 toward one another. One of the lugs 34 has in addition a screw 37 that will act to hold the ends of the outer race 32 apart, whereby the screw 37 and the bolt 35 together can be utilized to hold the ends of the outer race in a precisely adjusted position. The particular arrangement enables me very easily to assemble the outer race 32 to the inner race 30, with ball bearings 38 between the races. Thus, with the bolt 35 loose, the outer ball race 32 naturally can be expanded and will then permit the ball bearings 38 to be very readily assembled between the inner and outer races 30, 32. Then, through manipulation of the bolt 35 and nut 36, the outer ball race 32 can be drawn about the ball bearings 38 whereby to fit the outer race, ball bearings, and inner race relatively to one another. Of course, the screw 37 can be so set that the outer race 32 will not cause the bearings 38 to bind as they rotate. I prefer to protect the ball bearings 38 against dirt through a dust ring 39, best seen in Fig. 3, that is supported on the circular part 28 of the traction unit in position to extend over the ball races 30, 32.

Through the construction thus far described, the steering and traction unit 13, together with the inner and outer races 30, 32 and ball bearings, will form a complete sub-assembly. That sub-assembly will be assembled to the truck through insertion upwardly through the frame opening 21, and will then support the truck frame 10 through a direct bearing relation that I arrange between the frame and the outer ball race 32. For the particular purpose, I prefer to equip the frame 10 at its lower side with a series of spacer portions 40, best seen in Figs. 4 and 5, that are arranged about the frame opening 21. I form the outer ball race 32 with relatively wide extension portions 41 that will bear against the spacer portions 40 to support the circular part 28 of the unit 13 in position to rotate in the opening 21 in the truck frame 10. It is conceivable, of course, that the outer ball race 32 may be arranged with the extension portions 41 contacting directly the lower surface of the truck frame 10, but I do prefer to utilize the arrangement that I have described. For holding the outer race 32 assembled to the truck frame 10, I utilize bolts 42 that are positioned in openings formed through the spacer portions 40 and extension portions 41, with a nut 43 securing each bolt. It will be appreciated that the openings through spacer portions 40 are so arranged as to accept the bolts 42 when the outer bearing race 32 is in adjusted position. Those openings may be formed to have clearance relatively to bolts 42, as shown in Fig. 4, so that bolts 42 need not always lie in exactly the same position when race 32 is adjusted. Thus, after assembling the steering and traction unit 13 and its bearings to form a sub-assembly, I can easily mount that unit on the truck frame with the unit very securely held by the bolts 42.

Those skilled in the art will now understand that I have conceived an extremely novel structure for mounting a steering and traction unit on an industrial truck. I utilize for the particular purpose anti-friction bearings that, together with their inner and outer races, are very easily assembled relatively to the steering and traction unit. When thus assembled, the bearings together with the unit form a sub-assembly that is mounted on the truck through extremely simple means. In addition, I am able to place the bearings at a relatively low point on the truck, the bearings thus acting rather near the point at which the driving and steering forces are applied to the front wheel of the truck, so that the bearings are not required to accept forces that are unduly large. It will be obvious, of course, that my novel construction will facilitate to a very considerable extent the repair of the truck in those instances in which it is desirable to remove the steering and traction unit from the truck. I believe, therefore, that the very considerable value of my invention will be appreciated.

I now claim:

1. In a truck of the class described, a main frame, a steering and traction unit comprising a motor and a steering and traction wheel, an inner circular bearing race fixed to said steering and traction unit with the center of its circular bearing portion lying in the steering axis of said unit relatively to the truck, an outer bearing race formed for assembly and adjustment relatively to said inner race, means for assembling and adjusting said outer race whereby to fit said outer race to bearings assembled between the inner and outer races with said inner race adapted for rotation on said bearings relatively to said outer race, said inner and outer races being formed with surfaces so coacting with the bearings whereby the bearings hold the races against displacement relatively to one another when said outer race is assembled and adjusted to fit said bearings, so as to form a complete sub-assembly with said steering and traction unit rotating together with said inner race on said bearings relatively to said outer race, and means independent of said adjusting means and additional thereto extending between said outer race and main frame for securing said outer race in bearing relation to the truck frame whereby to mount the steering and traction unit on the said main frame for steering rotation relatively thereto and for ready removal from said main frame with said inner and outer races as a complete sub-assembly.

2. In a truck of the class described, a main frame, a steering and traction unit comprising a motor and a steering and traction wheel, an inner circular bearing race fixed to said steering and traction unit with the center of its circular bearing portion lying in the steering axis of said unit relatively to the truck, an outer bearing race formed for assembly and adjustment relatively to said inner race, means carried by a part of said outer race for adjusting said outer race whereby to assemble and fit said outer race to bearings positioned between the inner and outer races with said inner race adapted for rotation on said bearings relatively to said outer race, said inner and outer races being formed with surfaces so coacting with the bearings that the bearings hold the races against displacement relatively to one another when said outer race is adjusted to fit said bearings, whereby to form a complete sub-assembly with said steering and traction unit rotatable with said inner race on said bearings relatively to said outer race, and means independent of said adjusting means and additional thereto extending between said outer race and main frame for securing said outer race in bearing relation to the truck frame whereby to mount the steering and traction unit on the said main frame for steering rotation relatively thereto, and for ready removal from said main frame with said inner and outer races as a complete sub-assembly.

3. In a truck of the class described, a main frame, a steering and traction unit comprising a motor and a steering and traction wheel, an inner circular bearing race fixed to said steering and traction unit with the center of its circular bearing portion lying in the steering axis of said unit relatively to the truck, a one-piece outer bearing race split for adjustment and assembly to said inner race, means carried by said outer race for adjusting said outer race at said split to fit and assemble said outer race to bearings positioned between the inner and outer races with said inner race adapted for rotation on said bearings relatively to said outer race, said inner and outer races being formed with surfaces so coacting with the bearings whereby the bearings hold the races against displacement relatively to one another when said outer race is adjusted to fit said bearings so as to form a complete sub-assembly with said steering and traction unit rotatable with said inner race on said bearings relatively to said outer race, and means independent of said adjusting means extending between said outer race and main frame for securing said outer race in bearing relation to the truck frame whereby to mount the steering and traction unit on the said main frame for steering rotation relatively thereto, and for ready removal from said main frame with said inner and outer races as a complete sub-assembly.

4. In a truck of the class described, a main frame, a steering and traction unit comprising a motor and a steering and traction wheel, an inner circular bearing race fixed to said steering and traction unit with the center of its circular bearing portion lying in the steering axis of said unit relatively to the truck, a one-piece circular outer bearing race split for assembly and adjustment relatively to said inner race, means carried by said outer race for adjusting said outer race at said split to fit and assemble said outer race to bearings positioned between the inner and outer races with said inner race adapted for rotation on said bearings relatively to said outer race, said inner and outer races being formed with surfaces so coacting with the bearings whereby the bearings hold the races against displacement relatively to one another when said outer race is adjusted to fit said bearings so as to form a complete sub-assembly with said steering and traction unit rotating with said inner race on said bearings relatively to said outer race, said circular outer bearing race having a plurality of portions laterally extending when the steering and traction unit is vertical, and means independent of said adjusting means extending between said portions of said outer race and the main frame for securing said outer race in bearing relation to the truck frame whereby to mount the steering and traction unit on the said main frame for steering rotation relatively thereto, and for ready removal from said main frame with said inner and outer races as a complete sub-assembly.

References Cited in the file of this patent

UNITED STATES PATENTS 2,468,419     Weber _____ Apr. 26, 1949

FOREIGN PATENTS 890,161     Germany _____ Sept. 17, 1953
1,588     Great Britain _____ of 1885